United States Patent

Wong

[11] Patent Number: 5,285,516
[45] Date of Patent: Feb. 8, 1994

[54] FUSED FIBER OPTIC ATTENUATOR HAVING AXIALLY OVERLAPPING FIBER END PORTIONS

[75] Inventor: Ren-Sue Wong, Sunnyvale, Calif.
[73] Assignee: Kaptron, Inc., Palo Alto, Calif.
[21] Appl. No.: 853,468
[22] Filed: Mar. 18, 1992
[51] Int. Cl.[5] .................................................. G02B 6/26
[52] U.S. Cl. ........................................ 385/140; 385/96; 385/97
[58] Field of Search ................ 385/140, 134, 137, 96, 385/97, 98, 99

[56] References Cited

U.S. PATENT DOCUMENTS

| | | | |
|---|---|---|---|
| 3,825,319 | 7/1974 | Cook et al. | 385/96 |
| 3,960,531 | 6/1976 | Kohanzadeh et al. | 385/96 |
| 4,049,414 | 9/1977 | Smith | 385/96 |
| 4,261,640 | 4/1981 | Stankos et al. | 385/140 |
| 4,313,744 | 2/1982 | Toda | 385/134 |
| 4,544,231 | 10/1985 | Peterson | 385/96 X |
| 4,557,556 | 12/1985 | Decker, Jr. | 385/140 |
| 4,557,557 | 12/1985 | Gleason et al. | 385/140 |
| 5,095,519 | 3/1992 | Dorsey | 385/140 |

FOREIGN PATENT DOCUMENTS

| | | | |
|---|---|---|---|
| 52-68426 | 6/1977 | Japan | |
| 53-71844 | 6/1978 | Japan | 350/96.21 |
| 108452 | 9/1978 | Japan | |
| 54-2143 | 1/1979 | Japan | |
| 54-34250 | 3/1979 | Japan | 350/96.21 |
| 55-76315 | 6/1980 | Japan | 350/96.21 |
| 55-79402 | 6/1980 | Japan | 350/96.21 |
| 55-95918 | 7/1980 | Japan | |
| 56-59213 | 5/1981 | Japan | 350/96.21 |

OTHER PUBLICATIONS

Iwao Hatakeyama et al, "Fusion splices for optical fibers by discharge heating", *Applied Optics*, Jun. 15, 1978, vol. 17, No. 12, pp. 1959–1964.

Iwao Hatakeyama et al, "Fusion Splices for Single-Mode Optical Fibers", *IEEE Journal of Quantum Electronics*, Aug. 1978, vol. QE-14, No. 8, pp. 614–619.

Jack F. Dalgleish, "Splices, Connectors, and Power Couplers for Field and Office Use", *Proceedings of the IEEE*, Oct. 1980, vol. 68, No. 10, pp. 1226–1232.

D. L. Bisbee, "Splicing silica fibers with an electric arc", *Applied Optics*, Mar. 1976, vol. 15, No. 3, pp. 796–798.

*Primary Examiner*—John D. Lee
*Assistant Examiner*—Phan T. Heartney
*Attorney, Agent, or Firm*—Townsend and Townsend Khourie and Crew

[57] ABSTRACT

A method for fabricating single-mode and multi-mode attenuators characterized by a high level of wavelength insensitivity. A light source is connected to one end of a fiber and the other end is connected to an optical power meter. The optical power meter is set to a 0 dB reference. The fiber is then cut and the cut ends cleaved to define first and second segments. The ends of the segments are offset and overlapped by an axial distance that is large relative to the fiber diameter. The overlapping ends are heated so that they assume a fused state, and the relative axial positioning of the fiber ends while they are in the plastic state is adjusted to achieve the desired degree of attenuation, as indicated on the meter.

20 Claims, 2 Drawing Sheets

FUSED FIBER OPTIC ATTENUATOR HAVING AXIALLY OVERLAPPING FIBER END PORTIONS

BACKGROUND OF THE INVENTION

The present relates generally to fiber optics, and more specifically to a method for making an attenuator.

Although a primary virtue of optical fibers as a communication medium is the low loss of the fibers, there are instances where it is necessary to provide attenuation in the path. U.S. Pat. Nos. 4,557,556 and 4,557,557 disclose methods of fabricating attenuator for optical fibers by fusion splicing. In the '556 patent, a fiber is cleaved, and the axes of the cleaved ends are offset and butted one another. The abutted offset ends of the fibers are melted and the axes of the cores of the melted abutted fiber ends are aligned by way of surface tension. This realigns the cores, except that the cleaved ends of the cores bend off the axis in opposite directions. The technique is said to be applicable to single-mode optical fibers, which are characterized by a core diameter of 8-10 microns and a cladding diameter of 125 microns.

In the '557 patent, the cleaved fiber ends are aligned and melted, and while the ends are in a plastic state, they are moved towards each other to distort the fiber ends. The cores bend slightly near their abutted ends and are partially or wholly misaligned to provide the attenuation. During fabrication, light is injected into one of the fibers and a receiver is coupled to the other fiber. Initial axial alignment prior to fusing is performed by maximizing the transmission through the abutting fibers. When the fibers are fused, the power level is monitored and movement is stopped when a desired level of optical loss is observed.

SUMMARY OF THE INVENTION

The present invention provides a method for fabricating a fiber optic attenuator that is applicable to both single-mode and multi-mode fibers. The attenuators may be fabricated to provide any desired level of attenuation in a wide range of levels and are characterized by a high level of wavelength insensitivity.

In brief, the present invention contemplates bringing the end portions of a pair of fiber segments into a relative position where the radially outer surfaces of the fiber end portions are in contact with each other and overlap by an axial distance that is greater than the fiber diameter. The overlapping fiber end portions are heated so that they assume a plastic state, and the relative axial positioning of the fiber end portions is adjusted while they are in the plastic state to achieve a degree of attenuation. The ends of the fiber segments that are remote from the overlapping fused end portions are located on longitudinally opposite sides of the region of overlap.

Monitoring the attenuation during fabrication is performed as follows. A light source is connected to one end of a fiber and an optical power meter is connected to the other end. The optical power meter is set to a 0 dB reference. The fiber is then cut and the cut ends cleaved to define the first and second segments. The power meter will show a very high attenuation level since there is virtually no light being coupled between the fiber end portions. However, once the fiber ends are aligned and fusion is carried out, it is a relatively simple matter to adjust the relative axial, positioning and heating to achieve the desired attenuation.

A further understanding of the nature and advantages of the present invention may be realized by reference to the remaining portions of the specification and the drawings.

DESCRIPTION OF THE SPECIFIC EMBODIMENT(S)

Apparatus

Figure 1:
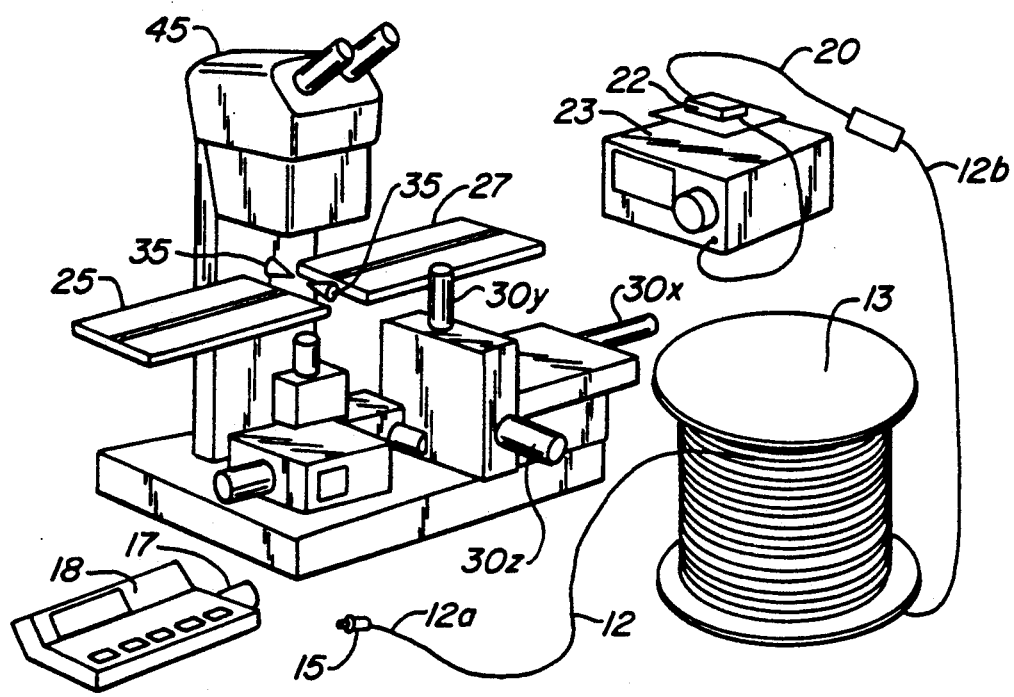
FIG. 1 is a simplified perspective view of apparatus for carrying out the present invention.

FIG. 1 is a simplified perspective view of apparatus 10 for constructing a fiber optic attenuator according to the present invention. Certain supporting structure is omitted for clarity. The present invention can be used to make single-mode or multimode attenuators. The workpiece is a length of fiber 12, here shown on a supply spool 13 containing perhaps hundreds or thousands of meters of fiber. The ultimate product typically uses a much shorter length of fiber (say on the order of 1 m). During the manufacturing process, transmission from one end of the fiber to the other is monitored. One end, designated 12a, of the fiber (the free end on the reel) is fitted to a fiber holder 15 which mates with a detector head 17 on an optical power meter 18. The other end, designated 12b, of the fiber (the tail on the reel) is spliced to a fiber pigtail 20 that is coupled to a light source 22 (laser diode for single-mode fibers), which has an associated power supply 23. The splice is taped to the workbench.

The apparatus has a fixed fiber platform 25 and a relatively movable fiber platform 27, each adapted to hold the end of a fiber. Platform 27 is provided with a three dimensional stage, which has x-axis, y-axis, and z-axis micrometer adjustments 30x, 30y, and 30z. A pair of arc electrodes 35 are shown schematically, and are mounted to an arc positioning stage 40. The arc positioning stage also provides x-axis, y-axis, and z-axis positioning. A microscope 45 is provided to aid the operator in alignment.

Fabrication Procedure

The initial step in the procedure is to mount the free end of the fiber into power meter fiber holder 15. A stripper is used to remove approximately 30 mm of buffer, and the fiber is cleaned with acetone and cleaved to provide a clean end. The fiber end is inserted into the fiber holder, which registers the fiber end with detector head 17. The other end of the fiber has been spliced into communication with laser diode source 22, and that connection normally remains undisturbed during the fabrication of a large number of attenuators (namely, until all the fiber on the reel is used up). once these connections have been established there is a continuous length of fiber between the source and the detector. The optical power meter is turned on and allowed to stabilize, and should show a relatively low level of attenuation. The meter is then zeroed so that it registers 0 dB, whereupon any attenuation introduced into the fiber will then show up directly on the meter.

The operator then unreels a length of fiber, perhaps one half meter longer than the ultimate device requires, breaks that length of fiber in half, strips the buffer off the respective end portions of what are now two separate fiber segments, and cleaves the ends. For ease of reference, the fiber segment that remains in communication with the power meter will be referred to as the short segment and the segment that remains in communication with the laser diode will be referred to as the long segment.

Figure 2:
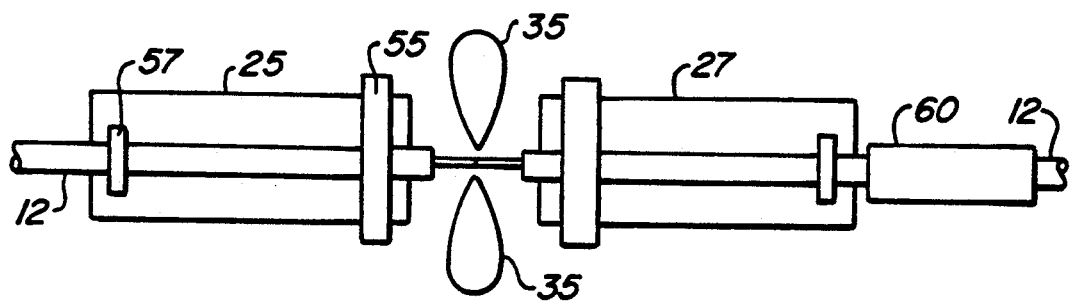
FIG. 2 is a top view showing the initial alignment of the fiber ends.

FIG. 2 shows the initial fiber alignment. The short segment is placed in a groove on the fixed platform, and positioned so that the end of the fiber lines up evenly with the arc electrodes. A hold-down bar 55 keeps the fiber seated in the groove, and a piece of tape 57 is applied to hold the fiber longitudinally. The long segment is similarly mounted to the movable platform, but prior to mounting, a segment of heat-shrink tubing 60 that is to serve a part of the primary device packaging is slipped over and away from the fiber end portions. The movable fiber platform is then adjusted so the fibers are coaxial and almost touching. At this point, any fine adjustments to the arc electrode position are made so that the arc is aligned with the fiber junction. In this position, each fiber segment has about 2 cm of unclamped length. The arc is powered for about 1 second to clean the fiber end portions.

Figure 3:
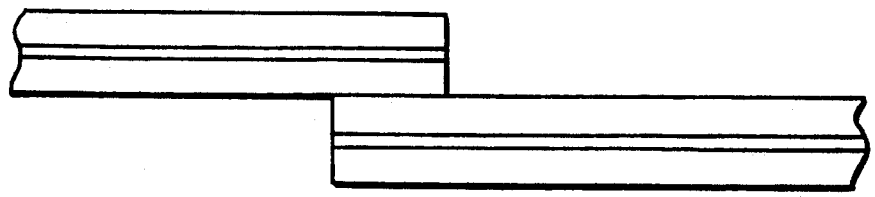
FIG. 3 shows the fiber alignment prior to fusing.

At this point, one of the fiber ends is displaced laterally with a clean probe, and the movable platform is readjusted to provide on the order of 0.5–5 mm (preferably 1–3 mm) of longitudinal overlap. This final alignment prior to fusing is shown in FIG. 3.

The arc power is turned on for 2 seconds while the stage axis micrometer is rotated slowly in a direction tending to move the fiber end portions apart. If the power level is correct, the light will appear as bright white and a fused blob will appear at the fusion joint. Insufficient power will manifest itself as a blue flame while a power level that is too high will melt the end portions of the fiber segments to the point to where they separate. The nature of the fusion splice is that the very ends of the cores must be encapsulated within the fused region. Should it be desired to have a longer degree of overlap between the two segments, it may be necessary to move the arc electrodes along the direction of the fiber axes to ensure complete encapsulation.

The fusion splice is allowed to cool for several seconds, and the optical power meter reading is observed. If the reading is higher (in dB) than is desired, the power can be turned on for another second. This process can be repeated, although it may also be necessary to move the arc electrodes slightly away from the junction prior to energizing the arc for another second. If the power meter reading is lower than desired, signifying insufficient attenuation, the stage axis micrometer handle can be turned in a direction tending to push on the fiber junction and causing the junction to expand under heat. This should typically be done in small (say 0.1 mm) increments. This process may be repeated to increase the attenuation to the desired level.

The tape is removed from the two platforms, the holddown bars are raised to free the fused fibers, and the segment of primary package tubing is slid over the fused section and heated. A metal stiffening bar, itself encapsulated in heatshrink tubing, may be inserted into the primary package tubing prior to heating. The optical power meter level is checked to ensure that the reading is still within the specified limits for the final product being produced. Packaging the device is not part of the invention, and it will not be described in detail. It is, however, noted that typical packaging has the primary package epoxied into a metal tube, the ends of which are sealed with rubber end caps that are cemented into place with epoxy or RTV.

Performance

As a matter of background information, a single-mode fiber has a core diameter in the 8.3–10 $\mu$ range, a cladding diameter of 125 $\mu$, and a buffer diameter of 250 $\mu$, 500 $\mu$, or 900 $\mu$. Operation is at wavelengths in the 1200–1600 nm range. Multi-mode fibers are available with core diameters of 50 $\mu$, 62 $\mu$, and 100 $\mu$, all with a cladding diameter of 125 $\mu$, and with a core diameter of 1004 and a cladding diameter of 140 $\mu$. Operation is at wavelengths in the 700–1600 nm range.

Figure 4A:
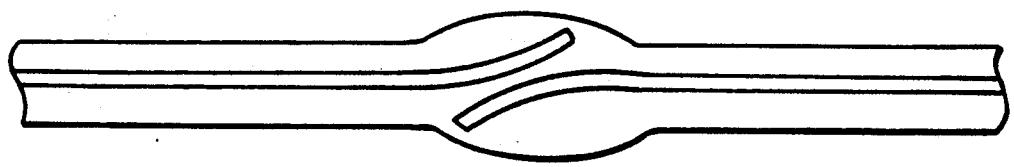
FIGS. 4A-C show the end result after fusing with various amounts of fusing and pulling.
Figure 4B:
Figure 4C:

Various possible fusion splices are shown in FIGS. 4A–C. As understood, the coupling of the light (attenuated) between the overlapping fiber end portions results from evanescent wave coupling and leakage. The fact that the cores overlap along a portion of their length in a fused splice leads to evanescent wave coupling, the degree of which depends on the amount of overlap and the proximity of the cores. The fact that the cores are bent and tapered near their ends causes the guided mode (or modes) to leak out and couple to other fiber. These mechanisms provide the basis for easy control over a wide range of attenuation during the fabrication process.

Table 1 shows the results of attenuation measurements for two multimode attenuators (nominal attenuation of 4 dB and 12 dB) taken over a 600–1600 nm range of wavelengths. Two features are noteworthy. First, the wavelength dependence of multimode attenuators fabricated according to the present invention is small. Second, the range of possible attenuation values for attenuators fabricated according to the present invention is large.

Table 2 shows the results of attenuation measurements taken for a single-mode attenuator (nominal attenuation of 3 dB) taken over a 1200–1600 nm range. Again the wavelength dependence is small.

Table 3 shows the results of attenuation measurements for three groups of ten single-mode attenuators (nominal attenuations of 10 dB, 5 dB, and 3 dB) fabricated using a 1310 nm single-mode laser for monitoring, and measured at both the 1310 nm wavelength and also using a 1550 nm single-mode laser. The variations at 1310 nm within a group are not significant since the fabrication process is interactive and the device can generally be made to exhibit a desired attenuation within any reasonable tolerance required. The variations between the two wavelengths are generally small, and can be seen to be reproducible small.

Table 4 summarizes the results shown in Table 3, and provides average values for return loss. Table 5 provides statistical results for changes in attenuation as the input polarization is varied over 360°, and changes in attenuation resulting from temperature cycling (four 3-hour cycles between −40° C. and +85° C. over a 12-hour period). Temperature and return loss data are also provided for groups of multimode attenuators.

Conclusion

In summary, it can be seen that the present invention lends itself to fabricating single-mode and multimode attenuators over a wide range of attenuation values. The attenuator performance is very stable over a wide range of wavelength, temperature, and polarization.

While the above is a complete description of the preferred embodiments of the present invention, various modifications, alternative constructions, and equivalents can be used. For example, while specific process parameters are specified, variations are possible, and may even be necessary under certain circumstances. Therefore, the above description and illustration should not be taken as limiting the scope of the invention which is defined by the claims.

TABLE 1

Attenuation of Multimode Attenuators as a Function of Wavelength

| Wavelength (nm) | Fiber #1 Loss (dB) | Fiber #2 Loss (dB) |
|---|---|---|
| 600 | 4.07 | 11.54 |
| 700 | 4.16 | 11.80 |
| 800 | 4.01 | 11.81 |
| 900 | 3.90 | 11.87 |
| 1000 | 3.84 | 11.81 |
| 1100 | 3.85 | 11.85 |
| 1200 | 3.82 | 11.79 |
| 1300 | 3.92 | 11.73 |
| 1400 | 3.93 | 11.59 |
| 1500 | 4.00 | 11.46 |
| 1600 | 3.77 | 11.64 |

TABLE 2

Attenuation of Single-Mode Attenuator as Function of Wavelength

| Wavelength (nm) | Loss (dB) |
|---|---|
| 1200 | 3.15 |
| 1250 | 3.07 |
| 1300 | 2.99 |
| 1350 | 2.95 |
| 1400 | 2.88 |
| 1450 | 2.97 |
| 1500 | 2.88 |
| 1550 | 2.84 |
| 1600 | 2.85 |

TABLE 3

| Sample Number | 1310 nm (dB) | 1550 nm (dB) | Deviation (dB) |
|---|---|---|---|
| 1 | 9.73 | 8.35 | 1.38 |
| 2 | 9.56 | 8.38 | 1.03 |
| 3 | 9.97 | 9.97 | 0.00 |
| 4 | 10.21 | 8.37 | 1.84 |
| 5 | 10.12 | 10.84 | 0.72 |
| 6 | 9.32 | 9.22 | 0.10 |
| 7 | 9.70 | 10.40 | 0.70 |
| 8 | 10.48 | 9.44 | 1.04 |
| 9 | 10.08 | 8.41 | 1.67 |
| 10 | 10.10 | 9.35 | 0.75 |
| 1 | 5.22 | 5.49 | 0.25 |
| 2 | 5.00 | 4.92 | 0.08 |
| 3 | 4.79 | 4.18 | 0.51 |
| 4 | 5.02 | 5.96 | 0.94 |
| 5 | 5.29 | 5.41 | 0.12 |
| 6 | 5.00 | 4.92 | 0.08 |
| 7 | 5.25 | 4.98 | 0.27 |
| 8 | 5.14 | 4.15 | 0.99 |
| 9 | 5.14 | 4.13 | 1.01 |
| 10 | 5.16 | 5.70 | 0.54 |
| 1 | 3.24 | 2.73 | 0.48 |
| 2 | 3.28 | 2.76 | 0.52 |
| 3 | 3.07 | 4.02 | 0.95 |
| 4 | 2.90 | 2.90 | 0.00 |
| 5 | 3.19 | 2.80 | 0.39 |
| 6 | 2.90 | 3.02 | 0.12 |
| 7 | 3.26 | 3.01 | 0.25 |
| 8 | 2.80 | 2.80 | 0.24 |
| 9 | 3.05 | 2.98 | 0.07 |
| 10 | 3.18 | 2.90 | 0.28 |

TABLE 4

| Attenuator | Number of Samples | Wavelength Change (1310/1550) | | | Loss Return Ave |
|---|---|---|---|---|---|
| | | Max | Avg | Min | |
| SM 3dB | 10 | 0.95 | 0.26 | 0 | >72 |
| SM 5dB | 10 | 1.01 | 0.60 | 0.08 | >72 |
| SM 10dB | 10 | 1.84 | 0.92 | 0 | >72 |
| MM 3dB | 10 | | | | η44 |
| MM 11dB | 22 | | | | >44 |

TABLE 5

| Attenuator | Number of Samples | Attenuation Change Resulting From Temperature Change (dB) | | | Attenuation Change Resulting From Polarization Change (dB) | | |
|---|---|---|---|---|---|---|---|
| | | Max | Avg | Min | Max | Avg | Min |
| SM 3dB | 10 | 0.7 | 0.13 | 0.04 | 0.02 | 0.01 | 0 |
| SM 5dB | 10 | 1.22 | 0.06 | 0.02 | 0.14 | 0.04 | 0.01 |
| SM 10dB | 10 | 1.65 | 0.09 | 0 | 0.24 | 0.05 | 0.01 |
| MM 3dB | 10 | 0.13 | 0.65 | 0.02 | | | |
| MM 11dB | 22 | 0.58 | 0.30 | 0.06 | | | |

What is claimed is:

1. A method for fabricating a fiber optic attenuator comprising the steps of:

providing first and second fiber segments, each segment having a fist nd and a second end, a portion of each segment including the first end being referred to as a first end portion, the fiber segments being characterized by a fiber diameter and the first end portions having respective radially outer surfaces;

bringing the respective first end portions of the fiber segments into a relative position such that the radially outer surfaces of the respective first end portions contact each other and the respective first end portions overlap by an axial distance greater than the fiber diameter;

heating the respective first end portions so that they assume a plastic state;

adjusting the relative axial positioning of the respective first end portions while the respective first end portions are in the plastic state to achieve a desired degree of attenuation; and cooling the respective first end portions to form a fused splice.

2. The method of claim 1 wherein the axial distance is in the range of about 0.5–5.0 mm.

3. The method of claim 1 wherein the axial distance is in the range of 1–3 mm.

4. The method of claim 1 wherein said adjusting step includes pulling the segments in an axial direction tending to move the segments apart.

5. The method of claim 1, and further comprising the step of injecting light into the second end of the first fiber segment and monitoring the light that emerges from the second end of the second fiber segment, and wherein said adjusting step is performed in response to the monitored light.

6. A fiber optic attenuator comprising:

first and second fiber segments, each having respective first and second ends, a portion of each segment including the first end being referred to as a first end portion, said fiber segments being characterized by a fiber diameter;

said respective first end portions being fused to each other and overlapping each other in an overlap region by an axial distance that is greater than said fiber diameter, said respective second ends being located on longitudinally opposite sides of said overlap region.

7. The attenuator of claim 6 wherein said fiber segments are single-mode fiber.

8. The attenuator of claim 7 wherein the attenuator is characterized by an attenuation greater than about 3 dB.

9. The attenuator of claim 6 wherein said fiber segments are multimode fiber.

10. The attenuator of claim 9 wherein the attenuator is characterized by an attenuation greater than about 10 dB.

11. A fiber optic attenuator comprising:

first and second segments, each having respective first and second ends, a portion of each segment including the first end being referred to as a first end portion, said fiber segments being characterized by a fiber diameter and having respective cores having respective ends;

said respective first end portions being fused to each other with said ends of said cores completely encapsulated and overlapping each other in an overlap region by an axial distance that is greater than said fiber diameter, said respective second ends being located on longitudinally opposite sides of said overlap region.

12. The attenuator of claim 11 wherein said fiber segments are single-mode fiber.

13. The attenuator of claim 12 wherein the attenuator is characterized by an attenuation greater than about 3 dB.

14. The attenuator of claim 11 wherein said fiber segments are multimode fiber.

15. The attenuator of claim 14 wherein the attenuator is characterized by an attenuation greater than about 10 dB.

16. A method for fabricating a fiber optic attenuator comprising the steps of:

providing first and second fiber segments, each segment having a first end and a second end, a portion of each segment including the first end being referred to as a first end portion, the fiber segments being characterized by a fiber diameter and the first end portions having respective radially outer surfaces;

bringing the respective first end portions of the fiber segments into a relative position such that the radially outer surfaces of the respective first end portions contact each other and the respective first end portions overlap in an overlap region by an axial distance greater than the fiber diameter with said respective second ends being located on longitudinally opposite sides of said overlap region;

heating the respective first end portions so that they assume a plastic state;

adjusting the relative axial positioning of the respective first end portions while the respective first end portions are in the plastic state t achieve a desired degree of attenuation; and cooling the respective first end portions to form a fused splice.

17. The method of claim 16 wherein the axial distance is in the range of about 0.5-5.0 mm.

18. The method of claim 16 wherein the axial distance is in the range of 1-3 mm.

19. The method of claim 16 wherein said adjusting step includes pulling the segments in an axial direction tending to move the segments apart.

20. The method of claim 16, and further comprising the steps of injecting light into the second end of the first fiber segment and monitoring the light that emerges from the second end of the second fiber segment, and wherein said adjusting step is performed in response to the light, so monitored.

* * * * *